US009907020B2

(12) United States Patent
Sen et al.

(10) Patent No.: US 9,907,020 B2
(45) Date of Patent: Feb. 27, 2018

(54) WAKE UP MESSAGE TRANSMISSION RATE

(71) Applicant: Hewlett Packard Enterprise Development LP, Houston, TX (US)

(72) Inventors: Souvik Sen, Mountain View, CA (US); Dongho Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/307,546

(22) PCT Filed: Jun. 10, 2014

(86) PCT No.: PCT/US2014/041720
§ 371 (c)(1),
(2) Date: Oct. 28, 2016

(87) PCT Pub. No.: WO2015/191044
PCT Pub. Date: Dec. 17, 2015

(65) Prior Publication Data
US 2017/0055217 A1 Feb. 23, 2017

(51) Int. Cl.
*H04B 1/38* (2015.01)
*H04M 1/00* (2006.01)
*H04W 52/02* (2009.01)
*H04W 40/00* (2009.01)
*H04W 88/02* (2009.01)
*H04W 88/08* (2009.01)

(52) U.S. Cl.
CPC ..... *H04W 52/0235* (2013.01); *H04W 40/005* (2013.01); *H04W 88/02* (2013.01); *H04W 88/08* (2013.01); *Y02B 60/50* (2013.01)

(58) Field of Classification Search
CPC .......... H04W 52/0235; H04W 40/005; H04W 88/02; H04W 88/08; Y02B 60/50
See application file for complete search history.

(56) References Cited

U.S. PATENT DOCUMENTS 5,790,946 A * 8/1998 Rotzoll ............ H04W 52/0229
455/343.1
6,480,476 B1 11/2002 Willars
(Continued)

FOREIGN PATENT DOCUMENTS

KR 10-2008-0113045 A 12/2008
KR 10-2010-0075615 A 7/2010
(Continued)

OTHER PUBLICATIONS

"DIR-601 Keeps Waking my computer up from sleep mode", Feb. 22, 2010.

*Primary Examiner* — Nguyen Vo
(74) *Attorney, Agent, or Firm* — Hewlett Packard Enterprise Patent Department

(57) ABSTRACT

Example implementations relate to an access point. One example apparatus includes a transceiver and a processor. The processor is to instruct the transceiver to transmit a first wake up message to a client device at a first transmission rate via a wireless network. The processor, in response to receiving a sleep message from the client device via the transceiver, is to instruct the transceiver to transmit a second wake up message to the client device at a second transmission rate that is greater than the first transmission rate.

20 Claims, 4 Drawing Sheets

(56) References Cited

U.S. PATENT DOCUMENTS

| | | |
|---|---|---|
| 8,160,045 B1 | 4/2012 | Chhabra |
| 8,379,555 B2 | 2/2013 | Tang et al. |
| 2009/0213821 A1* | 8/2009 | Fonseca, Jr. ...... H04W 52/0225 |
| | | 370/338 |
| 2012/0231747 A1 | 9/2012 | Chen et al. |

FOREIGN PATENT DOCUMENTS

| | | |
|---|---|---|
| KR | 10-2010-0133140 A | 10/2010 |
| KR | 10-2014-0037892 A | 3/2014 |
| TW | 358955 | 11/2009 |

* cited by examiner

WAKE UP MESSAGE TRANSMISSION RATE

BACKGROUND

Wireless technologies, such as Wi-Fi, have been widely adapted in various kinds of wireless computing devices, such as tablet computers, smart phones, laptop computers, etc. A wireless computing device may communicate with other wireless computing devices in a network, such as a local area network (LAN) or the Internet, via a wireless access point.

BRIEF DESCRIPTION OF THE DRAWINGS

Some examples of the present application are described with respect to the following figures.

DETAILED DESCRIPTION

Figure 1:
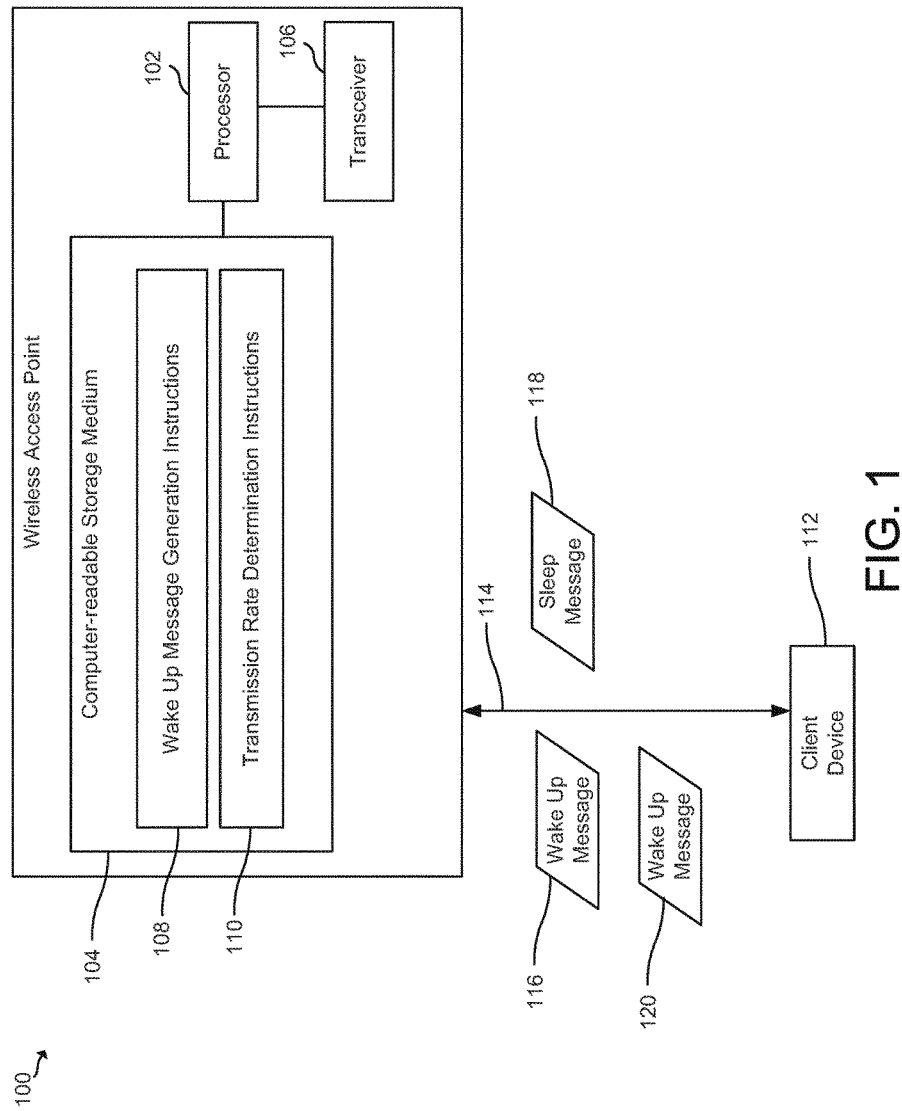
FIG. 1 is a block diagram of an example wireless access point for transmitting wake up messages to a client device.

As described above, a wireless computing device may communicate with other wireless computing devices in a network, such as a local area network (LAN) or the Internet, via a wireless access point (AP). Thus, the wireless computing device may be referred to as a client device. In some cases, a client device may operate in two operation modes, an active mode and a power save mode. During the active mode, the client device may exchange packets with other client devices via a wireless AP. When the client device does not receive packets from other wireless computing devices for a particular period of time or when the client device does not have any packets for transmission, the client device may enter into the power save mode.

During the power save mode, the client device may turn off a receiver of the client device to reduce power consumption. The client device may turn on the receiver to exit the power save mode and enter into the active mode periodically to receive a wake up message from the wireless AP. The wake up message may indicate whether there are packets pending for the client device. When there are packets pending, the client device may stay in the active mode to receive the packets. When there are no packets pending, the client device may enter into the power save mode again. However, the power save mode may negatively affect performance of latency sensitive applications. For example, a packet associated with a voice over Internet Protocol (VoIP) application may be delayed for transmission due to the client device operating in the power save mode. Thus, a user of the VoIP application may experience a delay in between conversations. For example, a user may hear a delay during a conversation due to a delay in receiving packets carrying the voice data.

Examples described herein address the above challenges by providing a wireless access point (AP) to reduce the frequency of a client device entering into the power save mode. For example, a wireless AP may transmit a first wake up message to a client device at a first transmission rate. In response to receiving a sleep message from the client device during a first transmission interval, the wireless AP may increase the first transmission rate to a second transmission rate. The wireless AP may transmit a second wake up message to the client device at the second transmission rate during a second transmission interval. The wireless AP may keep increasing a transmission rate of wake up messages until no sleep message is received from the client device during a wake up interval. The absence of sleep messages may indicate that the wireless AP is transmitting wake up messages to the client device at a transmission rate fast enough to enable the client device to stay in the active mode and not enter into the power save mode. In response to not receiving a sleep message during a wake up interval, the wireless AP may transmit subsequent wake up messages at a current transmission rate. In this manner, examples described herein may reduce a frequency of a client device entering into the power save mode.

Referring now to the figures, FIG. 1 is a block diagram of an example wireless access point (AP) 100 for transmitting wake up messages to a client device. Wireless AP 100 may be any device suitable to provide wireless network access to a client device, such as a tablet computer, a smart phone, a laptop computer, etc. In some examples, wireless AP 100 may be a wireless AP that is compliant with an Institute of Electrical and Electronics Engineers (IEEE) 802.11 protocol. Wireless AP 100 may include a processor 102, computer readable storage medium 104, and a transceiver 106.

Processor 102 may be a central processing unit (CPU), a semiconductor-based microprocessor, and/or other hardware devices suitable for retrieval and execution of instructions stored in computer-readable storage medium 104. Processor 102 may fetch, decode, and execute instructions 108 and 110 to transmit wake up messages to a client device 112 via a wireless network connection 114. As an alternative or in addition to retrieving and executing instructions 108 and 110, processor 102 may include at least one electronic circuit that includes electronic components for performing the functionality of instructions 108, 110, or a combination thereof.

Computer-readable storage medium 104 may be any electronic, magnetic, optical, or other physical storage device that contains or stores executable instructions. Thus, computer-readable storage medium 104 may be, for example, Random Access Memory (RAM), an Electrically Erasable Programmable Read-Only Memory (EEPROM), a storage device, an optical disc, etc. In some examples, computer-readable storage medium 104 may be non-transitory storage medium, where the term "non-transitory" does not encompass transitory propagating signals. As described in detail below, computer-readable storage medium 104 may be encoded with a series of processor executable instructions 108 and 110 for transmitting wake up messages to a client device and increasing a transmission rate of subsequent wake up messages in response to receiving a sleep message from the client device.

Transceiver 106 may be any electronic device suitable to transmit and receive data wirelessly. In some examples, transceiver 106 may be any electronic device suitable to transmit and receive data using air as a medium. In some examples, transceiver 106 may be any electronic device suitable to transmit and receive data using the IEEE 802.11 protocol. In some examples, transceiver 106 may include a transmitter and a receiver.

Client device 112 may be any computing device suitable to transmit and receive data wirelessly. Thus, client device 112 may be, for example, a tablet computer, a smartphone, a laptop computer, etc. Client device 112 may be associated with wireless AP 100 so that client device 112 may access a network, such as the Internet, and/or communicate with other client devices via wireless AP 100.

Wake up message generation instructions 108 may generate wake up messages for transmission to client device 112. A wake up message may be any message that is indicative of presence of pending packets for client device 112 so that client device 112 may stay in active mode instead of entering into the power save mode. In some examples, a wake up message may include a traffic indication map (TIM) to indicate presence of pending packets. In some examples, a wake up message may be transmitted as a packet in the form of a null data frame that includes control information but not a payload. A More Data field in the header portion of the null data frame may be set to indicate a presence of pending packets.

Transmission rate determination instructions 110 may determine a transmission rate used to transmit wake up messages by transceiver 106. A transmission rate may correspond to a frequency that a wake up message is transmitted. For example, a transmission rate may be one packet per second. Transmission rate determination instructions 110 may adjust the transmission rate based on a sleep message received from client device 112. A sleep message may be any message suitable to indicate a transition from the active mode to the power save mode. In some examples, a sleep message may be transmitted as a null data frame. The null data frame may include a power save mode field in the header portion of the null data frame. When the power save mode field is set, for example, by setting the power save mode field to a bit one, client device 112 may indicate to wireless AP 100 that client device 112 is to enter into power save mode.

Transmission rate determination instructions 110 may determine a current transmission rate that is used to transmit a wake up message to client device 112. Transmission rate determination instructions 110 may set the current transmission rate to a first transmission rate upon association with client device 112. For example, transmission rate determination instructions 110 may determine the first transmission rate via a lookup table. In some examples, the first transmission rate may be one packet per second. Transmission rate determination instructions 110 may instruct transceiver 106 to transmit a first wake up message 116 via a wireless network connection 114 using the first transmission rate as the current transmission rate.

In response to receiving first wake up message 116, client device 112 may operate in the active mode for a particular period of time to wait for the pending packet. In some examples, client device 112 may include a timer (not shown in FIG. 1) that may be activated upon receiving a wake up message, such as first wake up message 116. Upon expiration of the timer, client device 112 may transmit a sleep message 118 to wireless AP 100 to inform wireless AP 100 that client device 112 is to transition to the power save mode. Client device 112 may operate in the power save mode for another period of time before transitioning back to the active mode. The period of time during which client device 112 operates in the active mode may be an awake period. The period of time during which client device 112 operates in the power save mode may be a sleep period. Other mobile devices may have an awake period and/or a sleep period that is different from the awake period and/or the sleep period of client device 112.

In response to receiving sleep message 118 from client device 112 via transceiver 106 during a first wake up interval, transmission rate determination instructions 110 may set the current transmission rate to a second transmission rate that is greater than the first transmission rate. The first wake up interval is a time period between first wake up message 116 and a second wake up message 120 that is subsequent to first wake up message 116. For example, transmission rate determination instructions 110 may determine the second transmission rate via a lookup table. Second wake up message 120 may be transmitted to client device 112 when client device 112 exits the power save mode. As used herein, a wake up interval may be a period of time between successive wake up messages.

In response to receiving subsequent sleep messages, transmission rate determination instructions 110 may continue to increase the current transmission rate until no more sleep message is received from client device 112. When no sleep message is received from client device 112, transmission rate determination instructions 110 may maintain the current transmission rate. Transmission rate determination instructions 110 may instruct transceiver 106 to transmit subsequent wake up messages at the current transmission rate.

The absence of sleep messages may indicate that wireless AP 100 is transmitting wake up messages to client device 112 at a transmission rate fast enough to enable client device 112 to stay in the active mode and not enter into the power save mode. For example, the timer of client device 112 may be continuously reset by each successive wake up message prior to expiration of the timer so that the timer does not expire. Thus, client device 112 may not enter into the power save mode.

In some examples, transmission rate determination instructions 110 may increase the current transmission rate by a fixed increment, such as in one packet increments. For example, the current transmission rate may be one packet per second initially, in response to receiving a first sleep message, the current transmission rate may be increased by a one packet increment to two packets per second. In response to receiving a second sleep message subsequent to the first sleep message, the current transmission rate may be increased by another one packet increment to three packets per second.

In some examples, transmission rate determination instructions 110 may increase the current transmission rate by a variable increment. For example, in response to receiving the first sleep message, the current transmission rate may be increased by a one packet increment to two packets per second. In response to receiving the second sleep message, the current transmission rate may be increased by a three packet increment to five packets per second. Thus, by adjusting the current transmission rate in response to receiving at least one sleep message, wireless AP 100 may use wake up messages to reduce a frequency of client device 112 entering into the power save mode.

Figure 2:
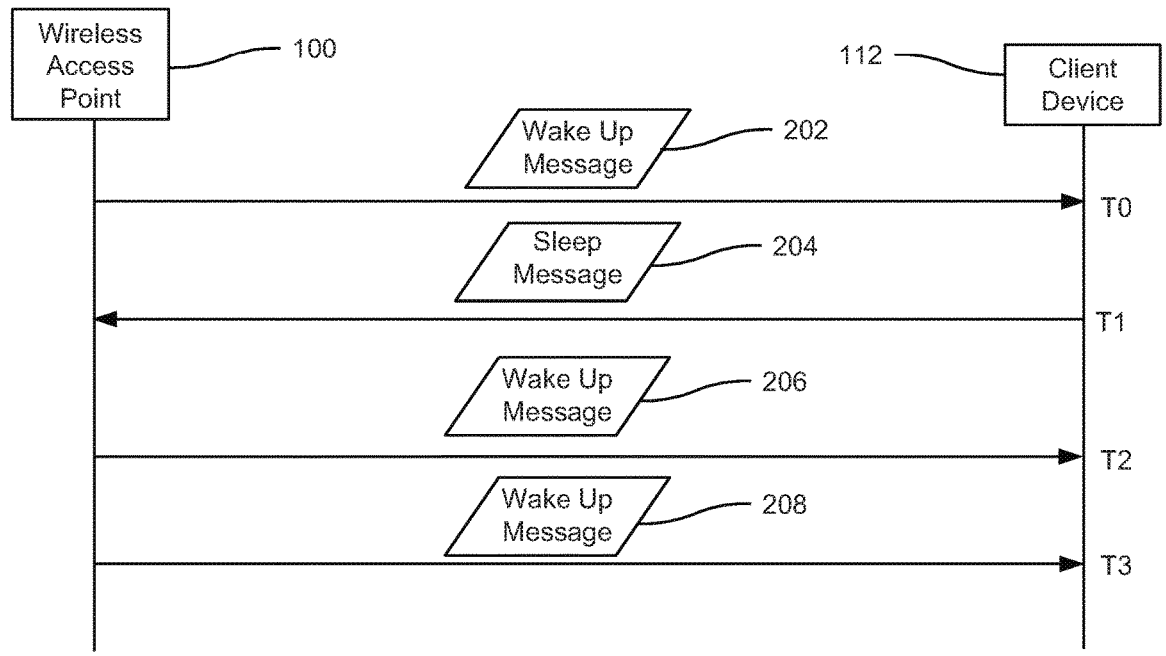
FIG. 2 is a ladder diagram of wake up messages transmitted from a wireless access point to a client device at a first transmission rate and at a second transmission rate, according to an example.

FIG. 2 is a ladder diagram of wake up messages transmitted from wireless access point (AP) 100 of FIG. 1 to client device 112 at a first transmission rate and at a second transmission rate, according to an example. At time T0, wireless AP 100 may transmit a wake up message 202 at a first transmission rate, such as one packet per second. During a first wake up interval between time T0 to time T2, wireless AP 100 may receive a sleep message 204 from client device 112 at time T1. Sleep message 204 may inform wireless AP 100 that client device 112 is to enter into the power save mode. In response to receiving sleep message 204, wireless AP 100 may increase the first transmission rate to a second transmission rate as sleep message 204 may indicate that the first transmission rate may not be fast enough to prevent client device 112 from entering into the power save mode.

At time T2, client device 112 may transition from the power save mode to the active mode. Wireless AP 100 may transmit a wake up message 206 to client device 112 at the second transmission rate. For example, the second transmission rate may be five packets per second. At time T3, wireless AP 100 may transmit a wake up message 208 that is subsequent to wake up message 206 to client device 112. As wireless AP 100 does not receive a sleep message during a second wake up interval between time T2 and T3, wireless AP 100 may determine that the second transmission rate is adequate to enable client device 112 to stay in the active mode and not enter into the power save mode. Thus, wireless AP 100 may transmit subsequent wake up messages at the second transmission rate.

Figure 3:
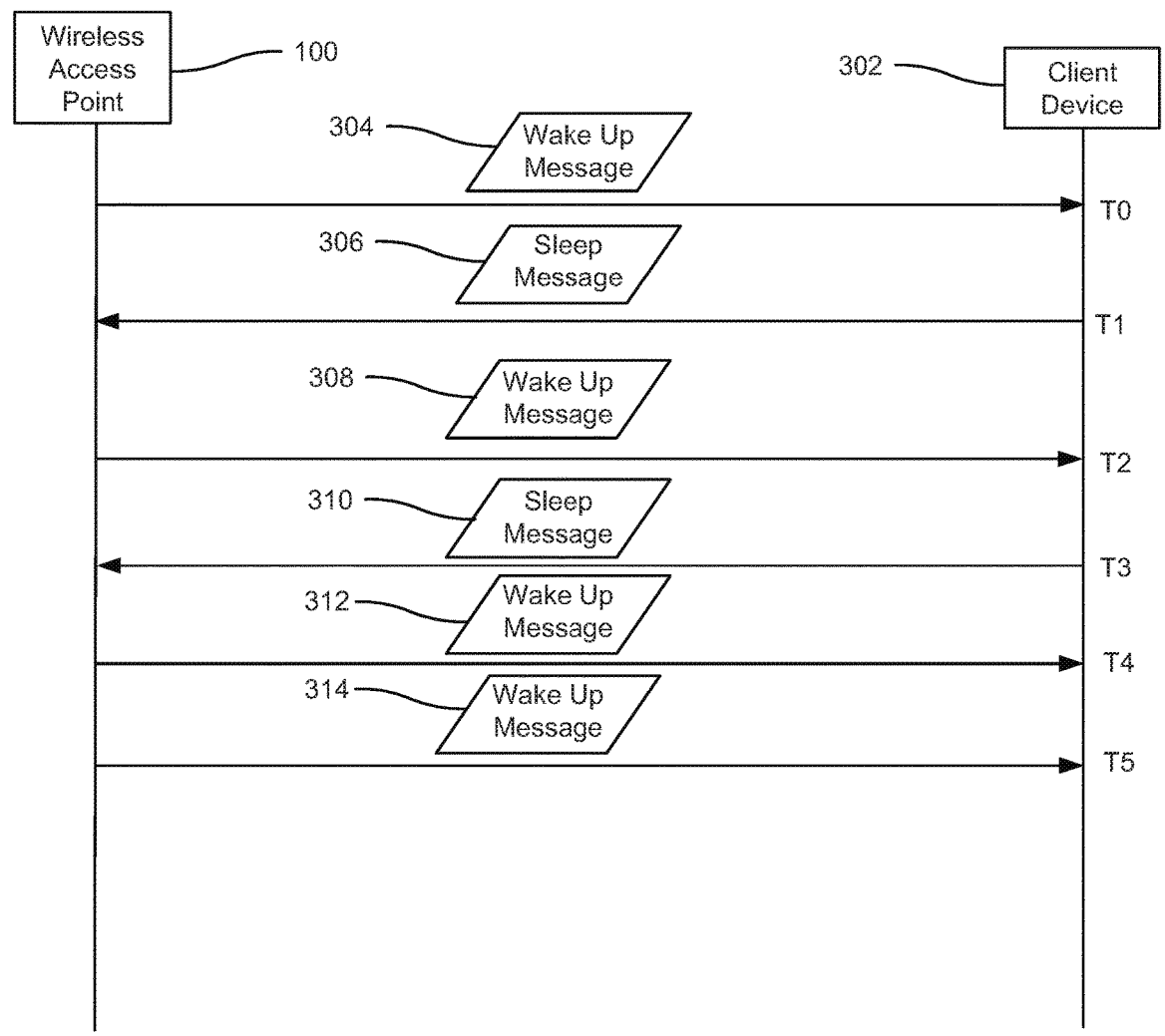
FIG. 3 is a ladder diagram of wake up messages transmitted from a wireless access point to a client device at a first transmission rate, a second transmission rate, and a third transmission rate, according to another example.

FIG. 3 is a ladder diagram of wake up messages transmitted from wireless access point (AP) 100 of FIG. 1 to a client device 302 at a first transmission rate, a second transmission rate, and at a third transmission rate, according to another example. Client device 302 may be similar to client device 112 of FIG. 1. However, client device 302 may have an awake period and/or a sleep period that is different from the awake period and/or the sleep period of client device 112.

At time T0, wireless AP 100 may transmit a wake up message 304 to client device 302. During a first wake up interval between time T0 and time T2, wireless AP 100 may receive a sleep message 306 from client device 302 at time T1. In response to receiving sleep message 306 from client device 302, wireless AP 100 may increase the first transmission to a second transmission rate. At time T2, wireless AP 100 may transmit a wake up message 308 to client device 302 at the second transmission rate. During a second wake up interval between time T2 and time T4, wireless AP 100 may receive a sleep message 310 from client device 302 at time T3. In response to receiving sleep message 310, wireless AP 100 may increase the second transmission rate to a third transmission rate. At time T4, wireless AP 100 may transmit a wake up message 312 to client device 302 at the third transmission rate. As wireless AP 100 does not receive a sleep message during a third wake up interval between time T4 and T5, wireless AP 100 may determine that the third transmission rate is adequate to enable client device 112 to stay in the active mode and not enter into the power save mode. Thus, wireless AP 100 may transmit subsequent wake up messages at the third transmission rate, such as a wake up message 314 transmitted at time T5.

Figure 4:
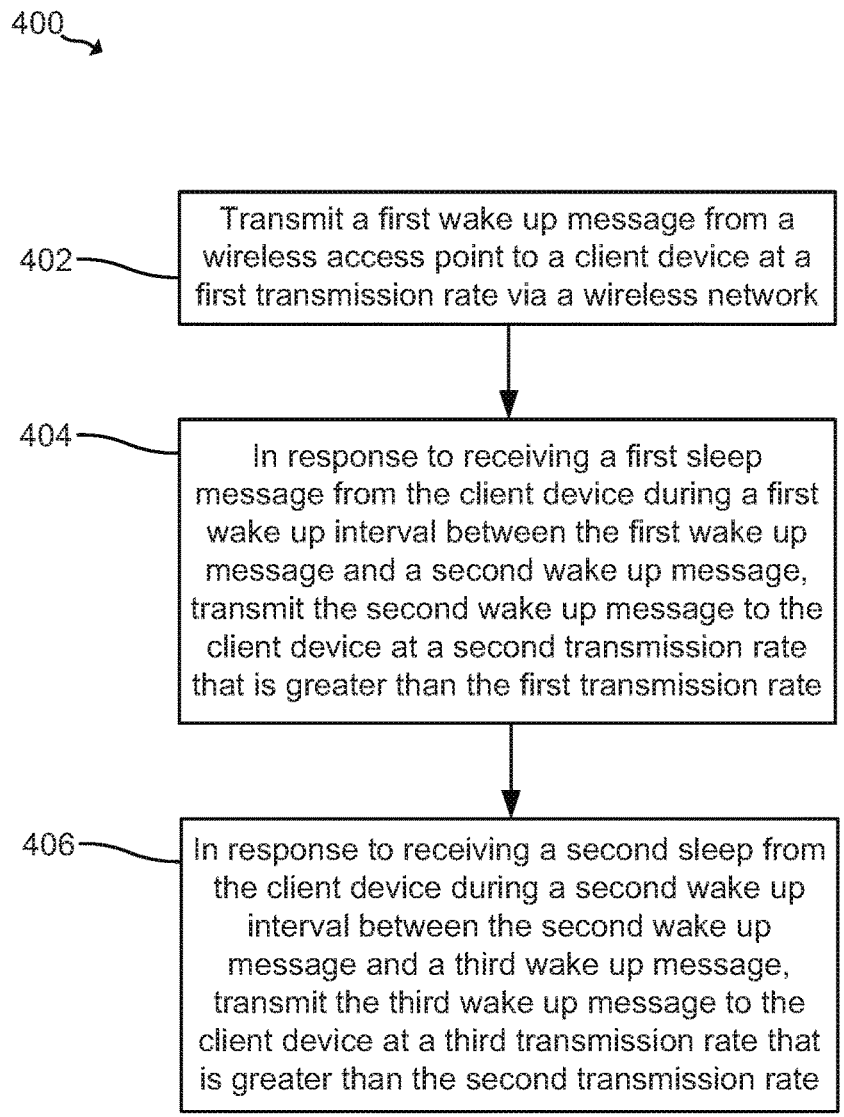
FIG. 4 is a flowchart illustrating an example method of a wireless access point transmitting wake up messages to a client device.

FIG. 4 is a flowchart illustrating an example method 400 of a wireless access point transmitting wake up messages, such as wake up messages 116 and 120 of FIG. 1 and/or wake up messages 202, 206, and 208 of FIG. 2, and/or wake up messages 304, 308, 312, and 314 of FIG. 3, to a client device, such as client device 112 of FIG. 1 or client device 302 of FIG. 3. Method 400 may be implemented using wireless AP 100 of FIG. 1. Method 400 includes transmitting a first wake up message from a wireless access point to a client device at a first transmission rate via a wireless network, at 402. For example, referring to FIG. 3, wireless AP 100 may transmit wake up message 304 to client device 302 at the first transmission rate.

Method 400 also includes, in response to receiving a first sleep message from the client device during a first wake up interval between the first wake up message and a second wake up message, transmitting the second wake up message to the client device at a second transmission rate that is greater than the first transmission rate, at 404. For example, referring to FIG. 3, wireless AP 100 may receive sleep message 306 from client device 302. In response to receiving sleep message 306 from client device 302, wireless AP 100 may increase the first transmission rate to the second transmission rate. Wireless AP 100 may transmit wake up message 308 to client device 302 at the second transmission rate.

Method 400 further includes, in response to receiving a second sleep from the client device during a second wake up interval between the second wake up message and a third wake up message, transmitting the third wake up message to the client device at a third transmission rate that is greater than the second transmission rate, at 406. For example, referring to FIG. 3, wireless AP 100 may receive sleep message 310 from client device 302. In response to receiving sleep message 310, wireless AP 100 may increase the second transmission rate to the third transmission rate. Wireless AP 100 may transmit wake up message 312 to client device 302 at the third transmission rate.

According to the foregoing, example embodiments disclosed herein enable a client device to reduce a frequency of entering into the power save mode. A wireless AP may adjust a transmission rate of wake up messages by gradually increasing the transmission rate in response to receiving at least one sleep message from the client device. When the transmission rate is adequate to enable the client device to stay in the active mode and not enter into the power save mode, the wireless AP may maintain the transmission rate for subsequent wake up messages.

The use of "comprising", "including" or "having" are synonymous and variations thereof herein are meant to be inclusive or open-ended and do not exclude additional unrecited elements or method steps.

What is claimed is:
1. An apparatus comprising:
a transceiver; and
a processor to:
    instruct the transceiver to transmit a first wake up message to a client device at a first transmission rate via a wireless network connection; and
    in response to receiving a sleep message from the client device via the transceiver, instruct the transceiver to transmit a second wake up message to the client device at a second transmission rate that is greater than the first transmission rate, wherein the sleep message is indicative of a power save mode of the client device.

2. The apparatus of claim 1, the processor further to:
in response to receiving a second sleep message from the client device, instruct the transceiver to transmit a third wake up message to the client device at a third transmission rate greater than the second transmission rate.

3. The apparatus of claim 1, the processor further to instruct the transceiver to transmit the second wake up message at the first transmission rate when no sleep message is received from the client device.

4. The apparatus of claim 1, wherein the wireless network connection is compliant with an Institute of Electrical and Electronics Engineers (IEEE) 802.11 protocol.

5. The apparatus of claim 1, wherein the first wake up message corresponds to a null data frame including a traffic indication map.

6. The apparatus of claim 5, wherein the null data frame includes a header portion.

7. The apparatus of claim 1, wherein the client device is to transmit the sleep message to the transceiver after an awake period measured based on the first wake up message.

8. The apparatus of claim 7, wherein the sleep message is to indicate that the client device is to enter the power save mode when the header portion is set to a bit value.

9. A method comprising:
- transmitting a first wake up message from a wireless access point (AP) to a client device at a first transmission rate via a wireless network;
- in response to receiving a first sleep message from the client device during a first wake up interval between the first wake up message and a second wake up message, transmitting the second wake up message to the client device at a second transmission rate that is greater than the first transmission rate; and
- in response to receiving a second sleep message from the client device during a second wake up interval between the second wake up message and a third wake up message, transmitting the third wake up message to the client device at a third transmission rate that is greater than the second transmission rate.

10. The method of claim 9, wherein the first transmission rate is one packet per second.

11. The method of claim 9, wherein the first sleep message is indicative of a power save mode of the client device.

12. The method of claim 9, wherein the wireless network is compliant with an Institute of Electrical and Electronics Engineers (IEEE) 802.11 protocol.

13. The method of claim 9, wherein the first wake up message corresponds to a null data frame including a traffic indication map.

14. The method of claim 9, wherein based on an association of the wireless AP with the client device, the wireless AP determines a current transmission rate to the client device.

15. The method of claim 9, wherein based on receiving a sleep signal from the client device, the wireless AP increases by a set increment a current transmission rate to the client device.

16. A non-transitory computer-readable storage medium comprising instructions that when executed cause a processor of a wireless access point (AP) to:
- instruct a transmitter of the wireless AP to transmit a first wake up message to a client device at a first transmission rate via a wireless network;
- in response to receiving a first sleep message from the client device during a first wake up interval between the first wake up message and a second wake up message, instruct the transmitter to transmit the second wake up message to the client device at a second transmission rate that is greater than the first transmission rate;
- in response to not receiving the first sleep message during the first wake up interval, instruct the transmitter to transmit subsequent wake up messages to the client device at the first transmission rate; and
- in response to receiving a second sleep message from the client device during a second wake up interval between the second wake up message and a third wake up message, instruct the transmitter to transmit the third wake up message to the client device at a third transmission rate that is greater than the second transmission rate.

17. The non-transitory computer-readable storage medium of claim 16, wherein the first sleep message is indicative of a power save mode of the client device.

18. The non-transitory computer-readable storage medium of claim 16, wherein the first wake up message corresponds to a null data frame including a traffic indication map.

19. The non-transitory computer-readable storage medium of claim 18, wherein the wireless network is compliant with an Institute of Electrical and Electronics Engineers (IEEE) 802.11 protocol.

20. The non-transitory computer-readable storage medium of claim 16, wherein the first transmission rate is one packet per second.

* * * * *